(12) United States Patent
Fontanesi

(10) Patent No.: US 7,694,823 B2
(45) Date of Patent: Apr. 13, 2010

(54) TRAVELER'S KITCHEN KIT

(76) Inventor: Lisa Elaina Fontanesi, 3321 Appleton St., Los Angeles, CA (US) 90039

( * ) Notice: Subject to any disclaimer, the term of this patent is extended or adjusted under 35 U.S.C. 154(b) by 0 days.

(21) Appl. No.: 12/113,872

(22) Filed: May 1, 2008

(65) Prior Publication Data

US 2008/0272024 A1 Nov. 6, 2008

Related U.S. Application Data

(60) Provisional application No. 60/915,317, filed on May 1, 2007.

(51) Int. Cl.
*B65D 71/00* (2006.01)
(52) U.S. Cl. .................... 206/576; 206/373
(58) Field of Classification Search ............ 206/576, 206/577, 372, 373, 320; 190/1, 107
See application file for complete search history.

(56) References Cited

U.S. PATENT DOCUMENTS

| | | | |
|---|---|---|---|
| 1,413,136 A | 4/1922 | Schmitt | |
| 1,590,586 A | 6/1926 | McDonald | |
| 1,659,114 A | 2/1928 | McDonald | |
| 2,603,500 A | 7/1952 | Messier | |
| 3,010,551 A | 11/1961 | Weeks | |
| 3,543,890 A | 12/1970 | Criswell | |
| 3,984,162 A | 10/1976 | Zozzaro | |
| 4,195,889 A | 4/1980 | Coyne | |
| 4,436,353 A | 3/1984 | Tucker | |
| 4,621,404 A * | 11/1986 | Browning | 29/463 |
| 5,110,193 A | 5/1992 | McClenning | |
| 5,269,599 A | 12/1993 | Moring | |
| 5,683,157 A | 11/1997 | Peterson et al. | |
| 6,000,509 A * | 12/1999 | Chisholm | 190/109 |
| 6,119,858 A * | 9/2000 | Davidson | 206/315.11 |
| 6,464,098 B1 | 10/2002 | Henson et al. | |
| D465,921 S | 11/2002 | Northrop et al. | |
| 6,543,436 B2 | 4/2003 | Montgomery | |
| 6,619,768 B1 | 9/2003 | Northrop et al. | |
| 6,637,562 B2 * | 10/2003 | Oh | 190/26 |
| 6,806,944 B2 | 10/2004 | Votipka et al. | |
| 6,910,560 B2 | 6/2005 | Dulin | |
| D507,876 S | 8/2005 | Fadely | |
| 7,278,539 B2 * | 10/2007 | Souza | 206/315.1 |
| 2005/0034949 A1 * | 2/2005 | Davies | 190/107 |
| 2005/0098403 A1 | 5/2005 | McIntyre | |

* cited by examiner

*Primary Examiner*—Jacob K Ackun, Jr.
(74) *Attorney, Agent, or Firm*—Fulwider Patton LLP

(57) ABSTRACT

A new and improved portable and easily maneuverable kitchen kit that organizes and retains essential cookware and utensils for transport. The invention may be useful for transporting cooking tools to a cooking class or a cooking party. The present invention is advantageous because cookware and utensils necessary for the culinary arts are readily organized and conveniently transportable by an individual. The traveler's kitchen kit of the present invention solves the problem of storing and transporting all of the necessary kitchen tools to a remote location.

12 Claims, 4 Drawing Sheets

TRAVELER'S KITCHEN KIT

BACKGROUND OF THE INVENTION

1. Field of the Invention

The present invention relates generally to portable tool kits. More specifically, the present invention relates to a portable tool kit configured to store and transport kitchen tools and cooking utensils.

2. Brief Description of Related Art

Many mobile tradesmen carry tools of the trade in readily portable tool kits. The tool kits may either be assembled by the individual user within a tool organizer or sold as a pre-assembled compilation of commonly used tools for a particular purpose, for example, tool kits for electronics, carpentry, or plumbing.

Small parties for adults or children may be organized within the theme of a cooking class. For example, a cooking instructor may come to a host's residence and provide a fun activity, which is organized around party guests cooking a meal. A problem for the cooking instructor, however, is not having all of the necessary tools present at the host's residence for properly demonstrating cooking techniques.

Furthermore, travelers staying at condominiums, time shares, or corporate housing are also faced with the problem of inadequate cooking supplies at a remote location. The kitchen tools at the remote location may be sparse or in poor condition. Traveling with a supply of kitchen tools packed in a cardboard box is clumsy and disorganized.

Portable pantries are known for use by caterers. These portable pantries are generally unsuitable for a small party because they are large and very heavy. Furthermore, these large pantries are not easily maneuvered by one person, especially up stairways or down narrow corridors, and generally must be transported in a truck or van.

On the other end of the spectrum are very small kits for picnics and camping. These kits do not provide organized storage for the necessary array of tools needed in a kitchen. These kits may also be heavy and difficult to carry when loaded with a plurality of kitchen cooking tools, such as pots, pans, and utensils.

What is needed is a small and easily portable traveling kitchen kit that contains essential kitchen tools, cookware, and kitchen utensils, while being easily maneuvered into a dwelling or business by an individual.

SUMMARY OF THE INVENTION

Briefly and in general terms, the present invention provides a new and improved portable kitchen kit that organizes and retains essential cookware and utensils. The invention may be useful for transporting cooking tools needed for a cooking class or a cooking party. The present invention is advantageous because cookware and utensils necessary for the culinary arts are readily organized and conveniently transportable by an individual. The traveler's kitchen kit of the present invention solves the problem of storing and transporting all of the necessary tools needed by a cooking instructor to a remote location. The traveler's kitchen kit of the present invention further provides an organized and readily mobile array of kitchen tools for travelers to remote locations, such as time shares, condominiums, or temporary executive housing.

In accordance with the present invention the traveler's kitchen kit includes at least one compartment configured for organization and storage of commonly needed kitchen tools, such as cookware and kitchen utensils. One aspect of the present invention is sub-compartments that are configured to releasably hold a variety of kitchen tools, for example, pots, pans, dishes, strainers, colanders, cooking gloves, clips, cheese grater, baking rack, measuring spoons, corkscrew, can opener, bottle opener, peeler, basting brush, rolling slicer, kitchen scissors, spice containers, sauce dispensers, various knives, various spoons, serving spoons, mixing spoons, forks, whip, tongs, etc. A still further aspect of the present invention is at least one removable sub-compartment positioned within the kitchen kit. Closures and retainers for the main compartment and/or sub-compartments may include zippers, buttons, snaps, hook and loop fasteners, elastic bands, magnets, and clasps. The sub-compartments may be configured to retain particular types of kitchen tools.

In a preferred aspect of the present invention, a primary compartment of the kit is further configured with wheels to provide easy portable movement of the kit while minimizing lifting of the kit. The wheels permit the kit, which may be heavy when loaded with kitchen tools to be rolled about, as well as carried. The kitchen kit of the present invention is highly portable and easily maneuvered, for example up stairs or along narrow corridors, by one person.

In one aspect, the traveler's kitchen kit includes a collapsible and expandable handle, which allows the kit to be rolled about without the user needing to excessively bend over.

BRIEF DESCRIPTION OF THE DRAWINGS

These and other features, aspects and advantages of the present invention are described with reference to drawings of a preferred embodiment, which are intended to illustrate, but not to limit, the present invention.

DETAILED DESCRIPTION OF THE PREFERRED EMBODIMENTS

Figure 1:
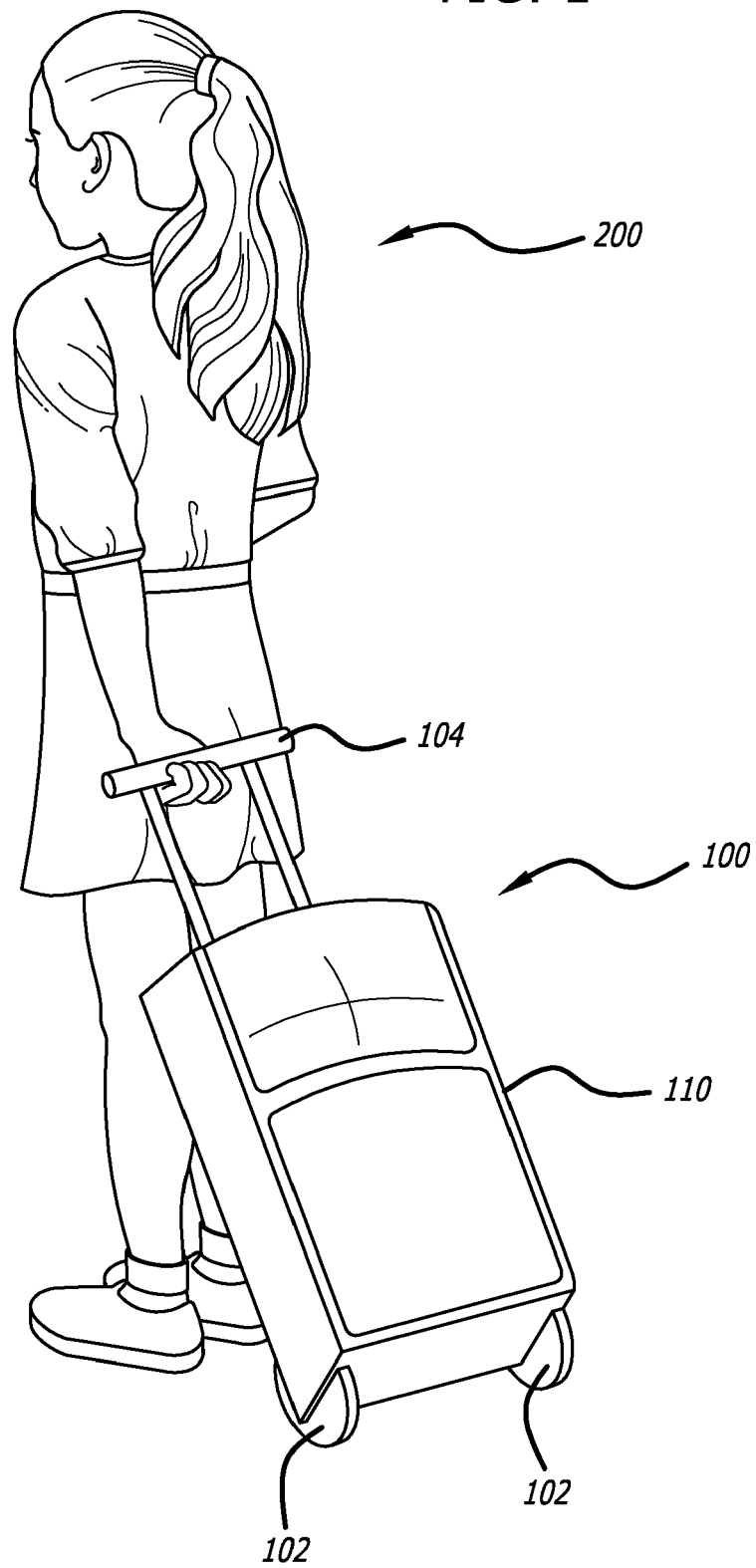
FIG. 1 is perspective view of a traveler's kitchen kit of the present invention being transported by a user.

Referring to the drawings, which are provided for purposes of illustration and by way of example, one embodiment of the present invention of a traveler's kitchen kit 100 is illustrated in FIGS. 1-4.

Referring first to FIG. 1, the kitchen kit 100 includes at least one primary compartment 110 configured for portably storing, organizing, and transporting at least kitchen tools 150, such as cookware and/or kitchen utensils. The primary compartment may be formed from natural or synthetic materials including plastic, canvas, polymers, and metals. In at least one embodiment, the primary compartment is further configured with rolling wheels 102. The primary compartment may be further provided with a handle 104, wherein the user of the kit may roll the kit along upon a surface without needing to bend over. The kit may be rolled behind the user 200, in front of the user, or beside the user. In at least one embodiment, the handle may be an expandable and collapsible handle well known in the art.

Figure 2:
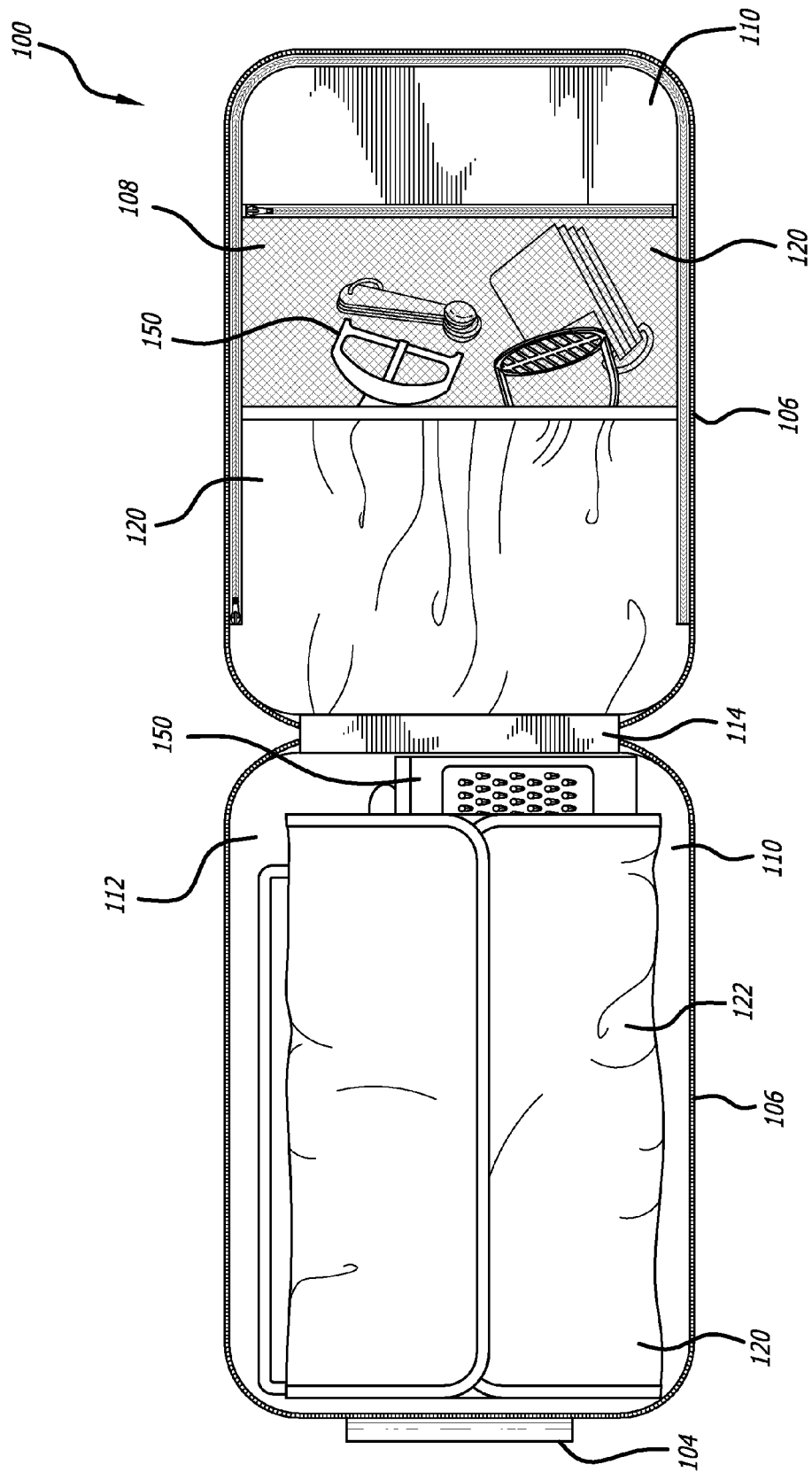
FIG. 2 is a view of an open primary compartment of the traveler's kitchen kit of FIG. 1, illustrating an interior space.

Referring also now to FIG. 2, the traveler's kitchen kit 100 has an interior space 112 disposed within the primary compartment 110 for organization, storage, and transportation of the kitchen tools 150. In one embodiment the primary compartment is bi-valved and includes a hinge 114 that provides for pivotably opening and closing the primary compartment. The kitchen kit further includes at least one closure 106 for securing/sealing the primary compartment. In one preferred embodiment, the closure may be a zipper. In another embodiment, at least one closure may include snaps, hooks, clasps, hook and loop fasteners, or other closures well known in the art.

Figure 3:
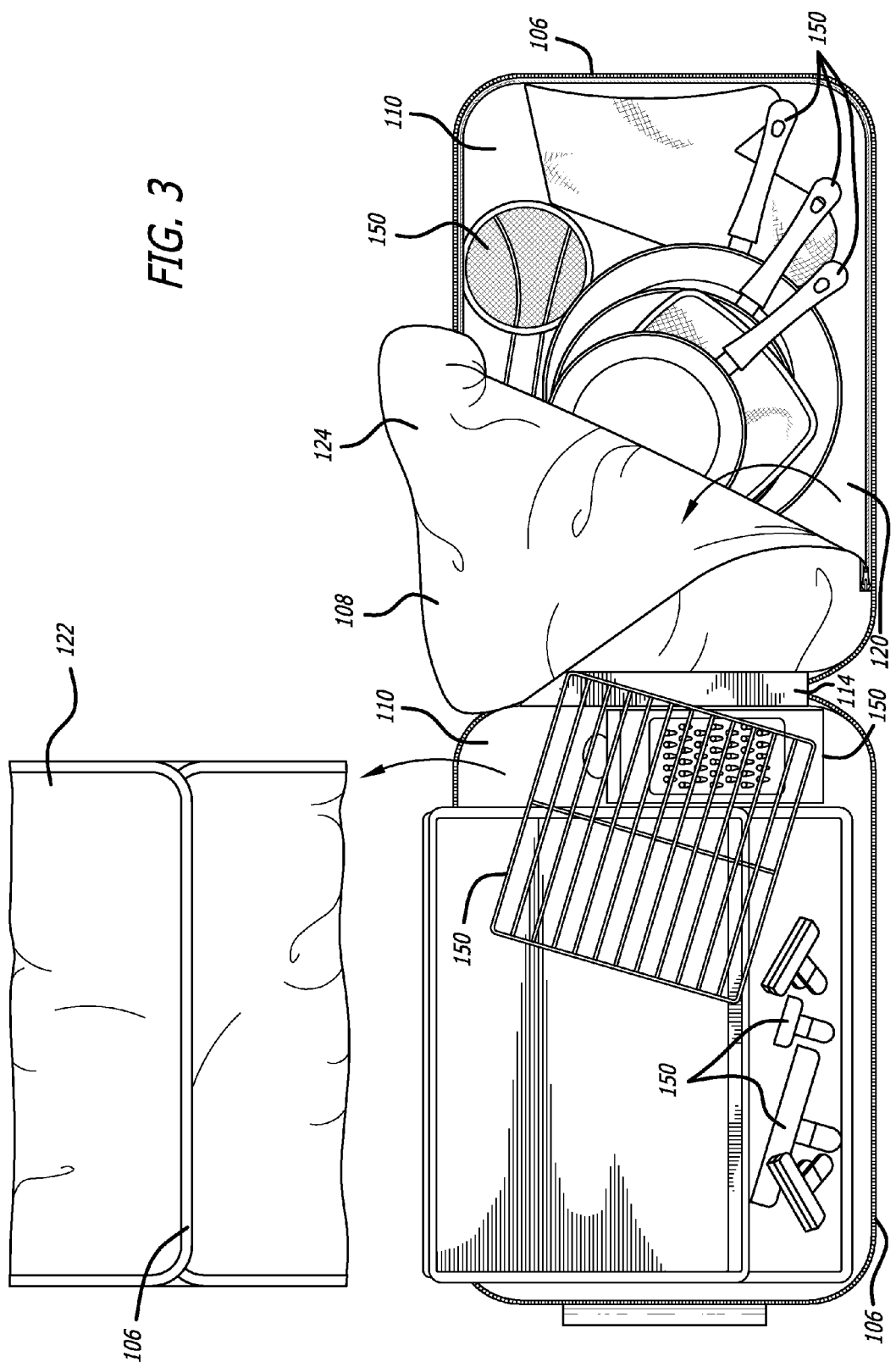
FIG. 3 is a view of sub-compartments located within the interior space of the primary compartment of the traveler's kitchen kit of FIG. 1.
Figure 4:
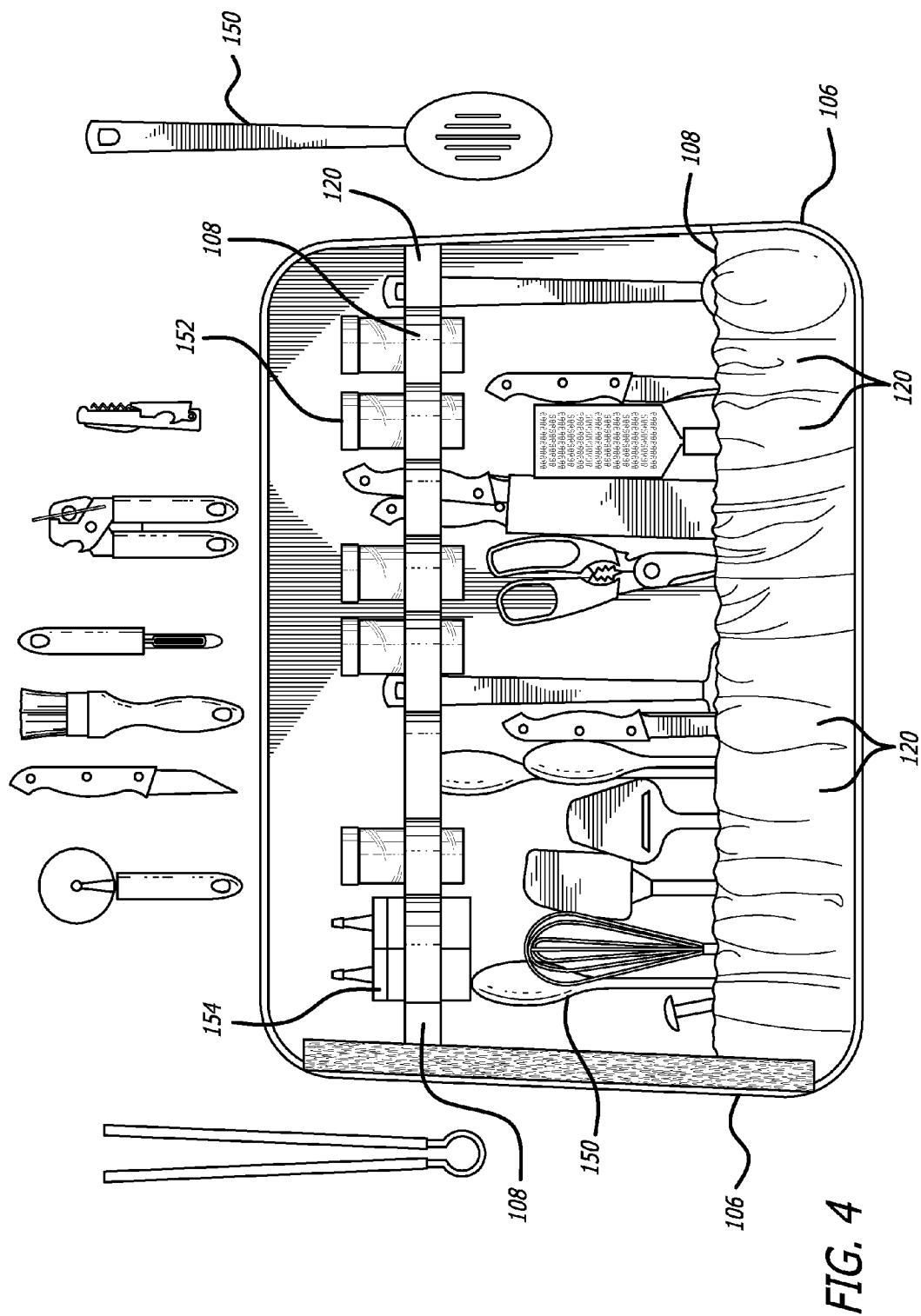
FIG. 4 is a view of sub-compartments located within the interior space of one embodiment of the traveler's kitchen kit of FIG. 1.

Referring further now to FIGS. 3 and 4, the primary compartment 110 of the traveler's kitchen kit 100 of the present invention may further include at least one sub-compartment 120 for organizing and retaining kitchen tools 150. The sub-compartments may include padded walls an/or may be formed of water-resistant materials. Closures 106 for the primary compartment and/or sub-compartments may include zippers, buttons, snaps, hook and loop fasteners, and clasps. The primary compartment and sub-compartments may include retainers 108, such as elastic bands, hook and loop fasteners, magnets, and clasps that prevent the kitchen tools from shifting during transportation and that are useful for keeping the tools organized. Another type of retainer particularly suitable for keeping larger kitchen tools in position is a flap 124, which is configured for covering and uncovering the kitchen tools. The flap may be formed of solid fabric or may be a mesh. Labels (not shown) may be provided for designating locations of kitchen tools within the sub-compartments, such that a tool may be readily located. Waterproof sub-compartments may also be included in the kit.

In another embodiment of the present invention, at least one sub-compartment 120 is a removable sub-compartment 122. The removable sub-compartment may be positioned within the primary compartment 110 of the kitchen kit 100 for transportation and detached from the primary compartment during use in a kitchen or when not necessary for a particular purpose. The removable sub-compartments allow selected kitchen tools to be positioned at a distance from the primary compartment. The removable sub-compartments also provide for easier cleaning of the kitchen kit.

Removable sub-compartments are further advantageous for organization of the kitchen tools 150, such as kitchen utensils. A plurality of removable sub-compartments, each including tools for a particular type of cooking purpose may be included, for example, one removable sub-compartment suitable for holding tools related to cooking pasta and another removable sub-compartment suitable for holding tools related to barbeque may be included. One or more of the removable sub-compartments may then conveniently be selected for placement in the primary compartment depending on the anticipated type of meal to be prepared, and the unwanted sub-compartments left behind.

In one embodiment of the present invention, sub-compartments 120 and/or removable sub-compartments 122 are configured to releasably hold a variety of kitchen tools 150, for example, pots, pans, dishes, strainers, colanders, cooking gloves, clips, cheese grater, baking rack, measuring spoons, corkscrew, can opener, bottle opener, peeler, basting brush, rolling slicer, kitchen scissors, spice containers, sauce dispensers, various knives, various spoons, serving spoons, mixing spoons, forks, whip, tongs, etc. The above listed kitchen tools are by way of example only, and the present invention may be used with other kitchen tools known in the art.

The sub-compartments may be configured for a certain type of kitchen tool 150. Sub-compartments 120, 122 may be configured to organize and retain primarily larger kitchen tools such as the pots, pans, dishes, strainers, colanders, and cooking gloves. A sub-compartment configured to hold such larger items may preferably include a retainer 108 that is a flap 124. At least one other sub-compartment may be configured to organize and retain primarily sharp kitchen tools such as knives, cheese graters, and vegetable peelers. A sub-compartment for a sharp tool may preferably be provided with a tougher cut resistant wall and more secure retainer. One further sub-compartment may be configured specifically to organize and retain cylindrical containers, such as spice containers 152 and/or sauce containers 154. Yet another sub-compartment may be longer and configured to organize and retain primarily longer kitchen tools, such as spatulas, tongs, and serving spoons.

The invention may be embodied in other forms without departure from the spirit and essential characteristics thereof. The embodiments described therefore are to be considered in all respects as illustrative and not restrictive. Although the present invention has been described in terms of certain preferred embodiments, other embodiments that are apparent to those of ordinary skill in the art are also within the scope of the invention.

The invention claimed is:

1. A portable kitchen, comprising:
   a primary compartment including a plurality of first sub-compartments disposed within said primary compartment, said plurality of first subcompartments configured to releasably retain a first plurality of kitchen articles, and a primary closure for securing said primary compartment;
   a plurality of second subcompartments, each including a secondary closure for securing each of said plurality of second subcompartments, respectively, said plurality of second subcompartments including a first subset of said plurality of second subcompartments and a second subset of said plurality of second subcompartments, each of said first and second subsets of said plurality of second subcompartments being receivable within a portion of said primary compartment, said first subset of said plurality of second subcompartments including at least two of said plurality of second subcompartments, said first subset of said plurality of second subcompartments being removably received within said portion of said primary compartment, said first subset of said plurality of second subcompartments removably retaining a second plurality of kitchen articles, said second subset of said plurality of second subcompartments removably retaining a third plurality of kitchen articles different from said second plurality of kitchen articles, and at least a portion of said first subset of said plurality of second subcompartments being interchangeable with at least a portion of said second subset of said plurality of second subcompartments;
   a handle connected to said primary compartment; and
   a plurality of wheels connected to said primary compartment.

2. The portable kitchen of claim 1, wherein said plurality of kitchen articles is selected from the group consisting of kitchen tools, food containers, and combinations thereof.

3. The portable kitchen of claim 2 wherein said kitchen tools are selected from the group consisting of cookware, utensils, and combinations thereof.

4. The portable kitchen of claim 1 wherein the primary compartment is bi-valved and has a hinge adapted for pivotally opening and closing the primary compartment.

5. The portable kitchen of claim 1 wherein the primary compartment includes a flap along a sidewall thereof constructed and arranged to be opened so as to be effective in keeping larger kitchen tools stationary within the primary compartment.

6. The portable kitchen of claim 1 wherein at least one subcompartment is configured to organize and retain a plurality of cylindrical containers.

7. The portable kitchen of claim 1 wherein the primary compartment and the subcompartments are formed from materials selected from the group consisting of plastic, canvas, polymers, and metals.

8. The portable kitchen of claim 7 wherein the materials of the subcompartment are cut-resistant.

9. The portable kitchen of claim 7 wherein the primary compartment is formed from a different material than the subcompartments.

10. The portable kitchen of claim 7 wherein the materials are water-resistant.

11. The portable kitchen of claim 1 wherein said primary closure comprises a water-tight material.

12. The portable kitchen of claim 1 wherein said second closure comprises a water-tight material.

* * * * *